United States Patent [19]
Campbell et al.

[11] Patent Number: 5,533,331
[45] Date of Patent: Jul. 9, 1996

[54] SAFE PROPULSION SYSTEM FOR MISSILE DIVERT THRUSTERS AND ATTITUDE CONTROL THRUSTERS AND METHOD FOR USE OF SAME

[75] Inventors: John G. Campbell, Northridge; Daniel W. Ruttle, Panorama City, both of Calif.

[73] Assignee: Kaiser Marquardt, Inc., Foster City, Calif.

[21] Appl. No.: 249,429

[22] Filed: May 25, 1994

[51] Int. Cl.$^6$ ............................................ F02K 9/42
[52] U.S. Cl. .................................. 60/204; 60/260
[58] Field of Search ..................... 60/39.06, 39.511, 60/39.821, 39.824, 204, 260, 257

[56] References Cited

U.S. PATENT DOCUMENTS

| | | | |
|---|---|---|---|
| 4,583,362 | 4/1986 | Wagner | 60/260 |
| 5,099,645 | 3/1992 | Schuler et al. | 60/260 |
| 5,417,049 | 5/1995 | Sackheim et al. | 60/260 |

OTHER PUBLICATIONS

Hoyte et al. *Complete Car Care Manual* Reader's Digest, Inc. 1981; p. 43.
Armstring et al. *The Diesel Engine* Macmillan Co. 1959; p. 36.

*Primary Examiner*—Louis J. Casaregola
*Attorney, Agent, or Firm*—John J. Posta, Jr.

[57] ABSTRACT

A propulsion system for use with a missile or like aerial projectile is disclosed which is suitable for use to operate the divert thrusters and the attitude control thrusters of such a missile while using non-toxic propellants which are entirely non-reactive during storage, transportation, and handling. In the preferred embodiment of the present invention, highly refined liquid hydrocarbon fuel and oxygen gas are used as the propellants, with a relatively small amount of the liquid hydrocarbon fuel and a relatively large amount of the oxygen gas being combusted in an oxygen heater to produce a hot oxygen gas containing only small amounts of the products of combustion. The liquid hydrocarbon fuel and the hot oxygen gas are burned in divert thrusters, and, optionally, in attitude control thrusters to produce thrust. The attitude control thrusters can instead alternately use either (cold) oxygen gas from the oxygen gas storage tanks, or hot oxygen gas from the oxygen heater to produce thrust in operation as jets.

11 Claims, 8 Drawing Sheets

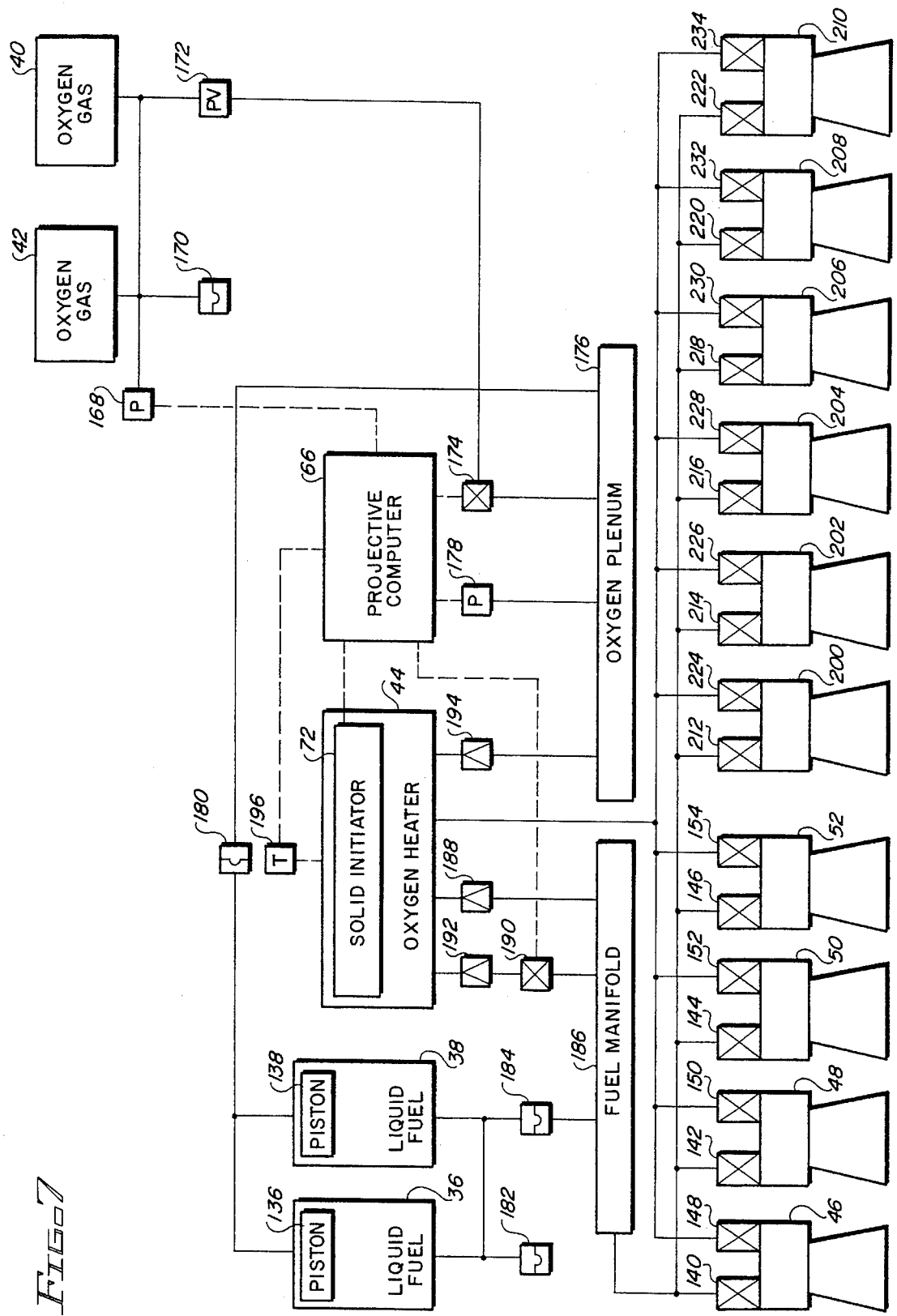

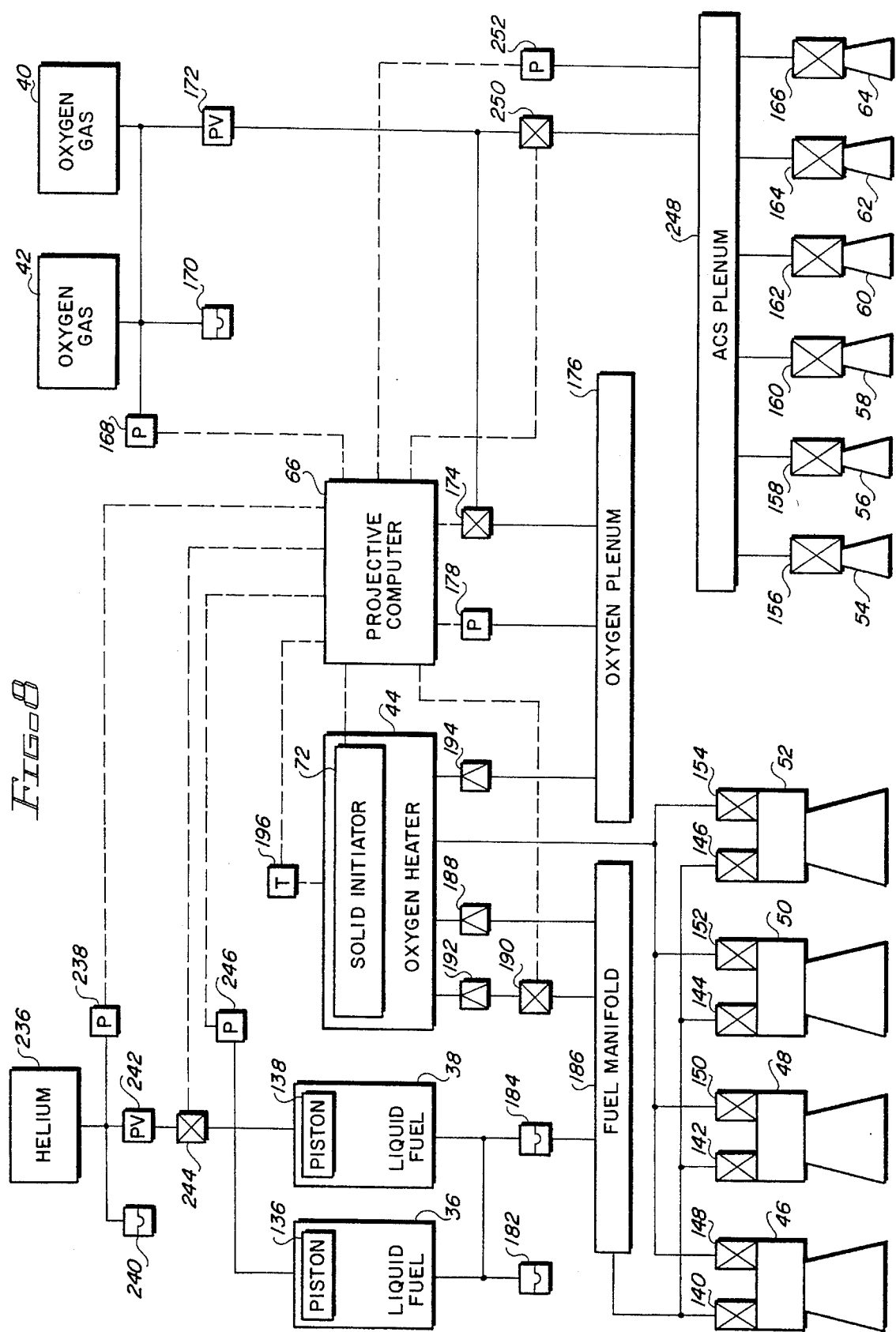

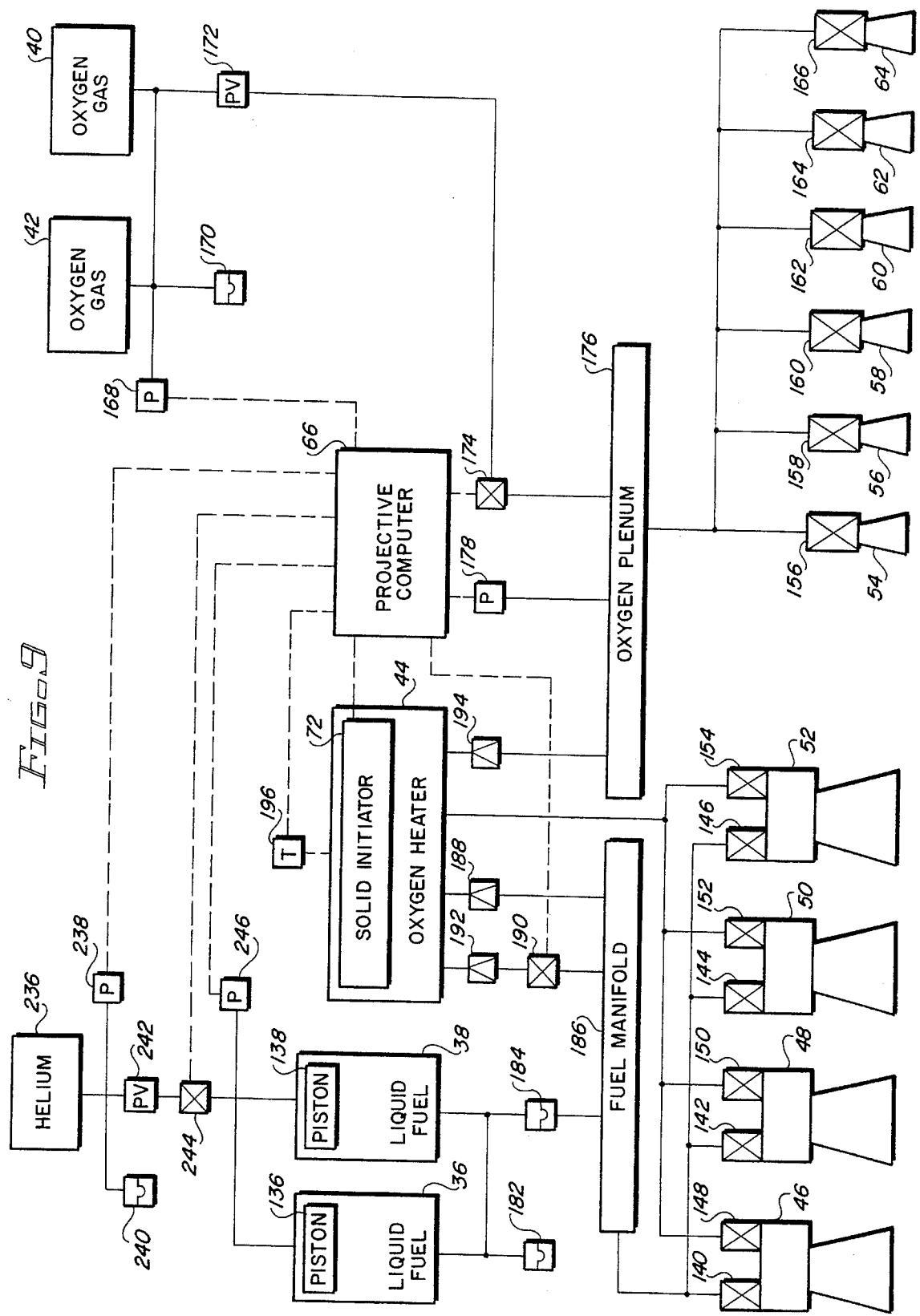

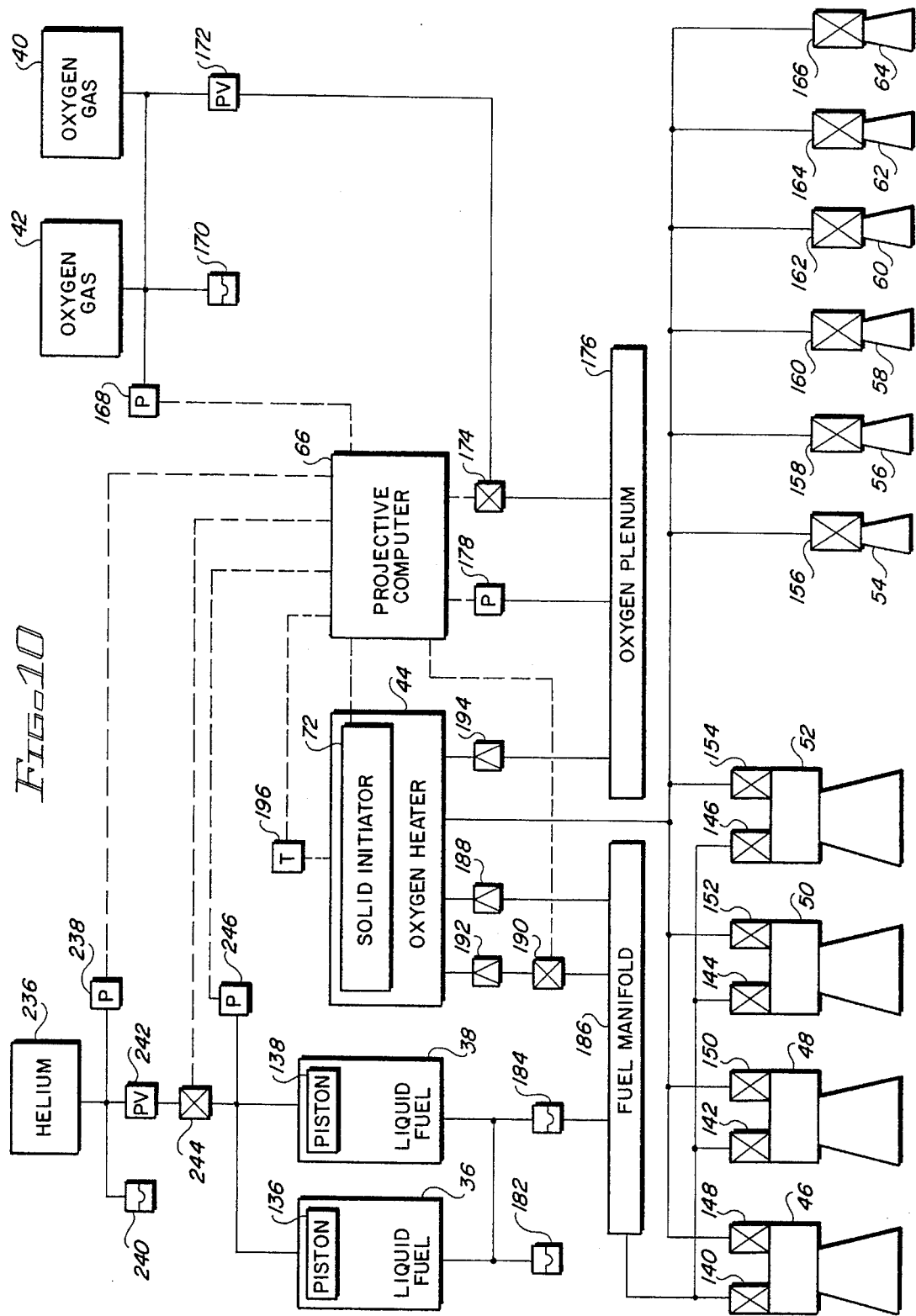

SAFE PROPULSION SYSTEM FOR MISSILE DIVERT THRUSTERS AND ATTITUDE CONTROL THRUSTERS AND METHOD FOR USE OF SAME

BACKGROUND OF THE INVENTION

Field of the Invention

The present invention relates generally to safe propulsion systems for use with a missile or like aerial projectile, and more particularly to an improved safe propulsion system which is suitable for use to operate the divert thrusters and the attitude control thrusters of such a missile while using non-toxic propellants which are entirely non-reactive during storage, transportation, and handling.

The field of missile science has advanced rapidly during the latter half of the twentieth century from its relatively primitive beginnings. Early guided missiles were essentially experimental, pilotless aircraft which were operated by radio control systems. The tremendous technological advances in electronics have been accompanied by similar advances in other essential fields such as rocket propulsion, inertial guidance and control systems, aerodynamics, material sciences, and radar systems. As a result, guided missiles today are mass-manufactured for a variety of purposes, ranging from military applications to carrying scientific instruments for use in gathering information at high altitudes, either within or above the earth's atmosphere.

While such guided missiles may vary considerably both in application as well as size, they all include three essential components: a power source for propelling them, a mission payload which is to be carried by the missile, and a guidance and control system. The first of these components is the power source, which may be either a self-contained rocket engine, or an air-breathing jet engine, depending on the application of the missile and intended altitude at which the missile is intended to fly. The second of the aforementioned components is the mission payload, which, as mentioned above, may vary widely, varying from scientific instruments, to surveillance equipment, to explosive warheads.

It is the third of the three essential components of a missile, namely the guidance and control system, which is the focus of the present invention. The internal guidance and control system of a missile includes two elements, the first being the "brains" of the guidance and control system, or the inertial navigation system of the missile. The second element of the guidance and control system is the apparatus which is used to produce the force necessary to guide the missile in its course. While in small missiles this force may be produced by moveable fins and other similar airfoils, in many missiles this apparatus typically includes the divert thrusters and the attitude control thrusters.

The divert thrusters are capable of producing a substantial amount of thrust which is used to effect substantial course changes, generally in two axes which are each orthogonal to the main longitudinal axis of the missile. The attitude control system thrusters, on the other hand, are used to effect a much finer degree of control on the missile, rolling it around its main longitudinal axis in either direction, or making fine course changes in one or more directions orthogonal to the main longitudinal axis of the missile. The divert thrusters and the attitude control thrusters are thereby used to effect control on the course of the missile, as directed by the inertial navigation system of the missile.

Three different types of propulsion systems have been predominantly utilized in the past for divert and attitude control systems used in missiles. These three propulsion systems are liquid bipropellant systems, liquid or gaseous monopropellant systems, and solid propellant systems. Although these three types of systems are all presently utilized, each of them has substantial disadvantages which are inherent in their use, as will become evident in the discussion to follow.

The first of the three systems widely utilized is the bipropellant system, which uses a distinct fuel and a distinct oxidizer. Typically, such liquid bipropellant systems use hydrazine or monomethylhydrazine as the fuel, and nitrogen tetraoxide as the oxidizer. In some applications, bipropellant systems use gels instead of liquids.

Such bipropellant systems present an extreme disadvantage in that they are highly toxic, and, as such, are completely unsatisfactory for applications requiring non-toxicity. In addition, the bipropellant systems are subject to detonation and rapid combustion when dropped or exposed to a fire, making them at least potentially highly dangerous. Finally, bipropellant systems are also dangerous in military field applications, where a stray bullet can potentially destroy the missile and everything in close proximity to it.

Liquid or gaseous monopropellant systems typically also use hydrazine as a monopropellant fuel. Such monopropellant hydrazine is also highly toxic, and once again hydrazine is unsatisfactory for use in applications which require non-toxicity. Monopropellant hydrazine systems are also subject to detonation and rapid combustion when dropped or exposed to a fire, or when hit by a stray bullet. Hydrazine monopropellants are also subject to detonation when heated to approximately 550° F. As such, monopropellant systems present many of the same disadvantages as bipropellant systems.

The third type of propulsion system is the solid propellant system, which presents an advantage over the aforementioned liquid bipropellant and monopropellant systems in that solid propellant systems are relatively non-toxic. Solid propellant systems will, however, detonate when exposed to a fire or hit by a stray bullet. In addition, solid propellant systems present several significant disadvantages not found in liquid bipropellant and monopropellant systems.

First, solid propellant systems are not capable of efficient on-off pulsing operation, which presents a heavy disadvantage when solid propellant systems are used in divert and attitude control propulsion systems. In addition, solid propulsion systems have other significant operational disadvantages, such as relatively heavy weight and a poor ability to allow control of the system center-of-gravity. As such, solid propulsion systems are even more disadvantageous in operation than are the aforementioned liquid bipropellant and monopropellant systems.

It is accordingly the primary objective of the present invention that it present an improved propulsion system useable for divert and attitude control systems, and a related method for use thereof, which system and method use non-toxic propellants exclusively. As such, it is a further objective of the present invention that both the fuel and the oxidizer be non-toxic to thereby eliminate one of the most serious drawbacks of previously known liquid or gel bipropellants or monopropellants. It is an additional objective of the propulsion system and the related method of the present invention that the propellants not be subject to detonation in a fire, when hit by a stray bullet, or when subjected to high temperature.

It is a further objective of the propulsion system and the related method of the present invention that the propulsion system be efficiently operable in an on-off pulsatile manner. It is yet another objective of the present invention that the improved propulsion system present excellent center-of-gravity control such that the characteristics of the missile in which the propulsion system is installed will feature excellent dynamic center-of-gravity characteristics. It is still another objective of the present invention that the weight of the improved propulsion system be relatively light in comparison to solid propulsion systems, and comparable to or less than the weight of previously known liquid bipropellant or monopropellant systems.

The propulsion system of the present invention must also be of a construction which is both durable during operation, and long lasting in a storage situation, and it should further require little or no maintenance to be provided throughout the time that it is stored. In order to compete effectively with previously known liquid bipropellant and monopropellant propulsion systems, and with solid propellant propulsion systems, the propulsion system of the present invention should be of comparable cost to these previously known systems, or less, to thereby afford it the broadest possible market. Finally, it is also an objective that all of the aforesaid advantages and objectives of the propellant system and the related method of use of the present invention be achieved without incurring any substantial relative disadvantage.

SUMMARY OF THE INVENTION

The disadvantages and limitations of the background art discussed above are overcome by the present invention. With this invention, a propulsion system and a related method for the use of the propulsion system are presented which present a number of novel features and advantages. First and foremost, the propulsion system and the related method of the present invention use entirely non-toxic propellants, the use of which to power such propulsion systems is heretofore unknown in the art. Second, the apparatus of the propulsion system of the present invention which allows the use of the novel propellants, together with the propulsion system's method of operation, are entirely novel.

The foundation of the present invention is the use of a highly refined liquid hydrocarbon fuel and oxygen gas as the propellants. In the preferred embodiment, the liquid hydrocarbon fuel used by the present invention is white mineral oil, a fuel previously unused as a propellant in missile propulsion systems. White mineral oil is as safe a fuel as can be found; its use as baby oil and in various food products is certainly sufficient testament to this fact. Similarly, oxygen is an element which is necessary for life, and as such is neither toxic nor corrosive in and of itself. The oxygen gas may be stored in oxygen storage tanks at high pressure, typically approximately 10,000 psia, while the liquid hydrocarbon fuel is stored in fuel storage tanks at low pressure, typically approximately one atmosphere.

It will at once be appreciated by those skilled in the art that the use of the novel propellants of the present invention presents significant advantages in storage, since the propellants of the present invention are neither as volatile nor as toxic as previously known propellants. However, due to the nature of the novel propellants utilized by the present invention, a novel propulsion system structure is certainly necessary to bring about the successful use of the propellants of the present invention. As this structure is discussed herein, it will also be appreciated by those skilled in the art that while the propulsion system of the present invention is remarkably novel, it is certainly neither difficult nor expensive to implement.

If the novel combination of propellants discussed above is the foundation upon which the present invention builds, then the heart of the present invention is an oxygen heater, which is used to produce heated oxygen gas at a temperature of approximately 1200° F. to 2000° F. The oxygen heater is supplied with oxygen gas at a pressure of approximately 1000 psi, and a small amount of the liquid hydrocarbon fuel at a similar pressure. Combustion in the oxygen heater may be initiated by a solid propellant initiator (which is the implementation chosen in the preferred embodiment), or, alternately, by a spark plug which may be used in addition to or instead of the solid propellant initiator.

Since a relatively large amount of oxygen gas is introduced into the oxygen heater with respect to the relatively small amount of the liquid hydrocarbon fuel introduced into the oxygen heater (typically approximately a 40:1 mass flow ratio), the gas stream leaving the oxygen heater contains only small amounts of products of combustion. Thus, the primary gaseous product leaving the oxygen heater will be oxygen gas (approximately 89 percent of the total gaseous products leaving the oxygen heater). The gas temperature in the oxygen heater for the 40:1 mass flow ratio will be approximately 1850° F., which temperature will be maintained by the oxygen heater even with the cool oxygen gas and the cool liquid hydrocarbon fuel entering the oxygen heater.

The liquid hydrocarbon fuel may be pressurized by using gas pressure acting on a piston contained in each of the fuel storage tanks containing the liquid hydrocarbon fuel. Pressurization of the fuel storage tanks may be generated either by an independent gas supply such as from high pressure helium tanks, or by cold oxygen gas supplied from the oxygen storage tanks. In the latter case, a burst disk is used to isolate the oxygen gas from the fuel storage tanks during storage, and this burst disk will remain intact until just before the propulsion system is to be used.

The propulsion system of the present invention may advantageously be used to operate the divert thrusters and the attitude control thrusters of a missile. The divert thrusters are bipropellant thrusters, with the propellants being the liquid hydrocarbon fuel together with the hot oxygen gas from the oxygen heater. Each of the divert thrusters has a pair of control valves, to respectively control the supply of liquid hydrocarbon fuel and the supply of hot oxygen gas to that particular divert thruster.

Ignition of the propellants in the divert thrusters of the present invention is accomplished by injecting the liquid hydrocarbon fuel into the hot oxygen gas stream. In a first embodiment, a single stage divert thruster is taught in which both ignition and combustion occur in a single ignition/combustion chamber. In a second embodiment, a two stage divert thruster is taught in which ignition occurs in an ignition chamber, with the primary combustion taking place in an adjacent downstream combustion chamber.

The attitude control thrusters of the preferred embodiment (which in all but one of the embodiments herein are properly referred to as jets rather than monopropellant thrusters) use only pressurized oxygen gas to produce thrust. In a first series of embodiments, the attitude control thrusters use cold oxygen gas from the oxygen storage tanks. In a second series of embodiments, the attitude control thrusters use hot oxygen gas from the oxygen heater. In each of these embodiments, the flow of oxygen to each attitude control thruster is controlled by a valve.

In an alternate embodiment, the attitude control thrusters are bipropellant thrusters, with the propellants being the liquid hydrocarbon fuel and the hot oxygen gas. In this embodiment, each of the attitude control thrusters has a pair of control valves, to respectively control the supply of liquid hydrocarbon fuel and the supply of hot oxygen gas to that particular attitude control thruster. Ignition of the propellants in the attitude control thrusters of this embodiment is accomplished by injecting the liquid hydrocarbon fuel into the hot oxygen gas stream in a manner similar to that described above with regard to the divert thrusters.

It may therefore be seen that the present invention teaches an improved propulsion system useable for divert and attitude control propulsion systems, and a related method for use thereof, which system and method exclusively use propellants which are non-toxic. As such, both the fuel and the oxidizer of the present invention are non-toxic, thereby eliminating one of the most serious drawbacks of previously known liquid or gel bipropellants or monopropellants. The propellants used by the propulsion system and the related method of the present invention are not subject to detonation in a fire, when hit by a stray bullet, or when subjected to high temperature.

The propulsion system and the related method of the present invention are efficiently operable in an on-off pulsatile manner, unlike solid propellant systems. The improved propulsion system of the present invention also presents excellent center-of-gravity control, such that the characteristics of the missile in which the propulsion system of the present invention is installed will also feature excellent dynamic center-of-gravity characteristics. The weight of the improved propulsion system of the present invention is also relatively light in comparison to solid propulsion systems, and in fact is comparable to or less than the weight of previously known liquid bipropellant or monopropellant systems.

The propulsion system of the present invention is also of a construction which is both durable during operation, and long lasting in a storage situation, and which requires little or no maintenance to be provided throughout the time that it is stored. The propulsion system of the present invention is of comparable cost to previously known liquid bipropellant and monopropellant propulsion systems, and to solid propellant propulsion systems, thereby affording the propulsion system of the present invention the broadest possible market. Finally, all of the aforesaid advantages and objectives of the propellant system and the related method of use of the present invention are achieved without incurring any substantial relative disadvantage.

DESCRIPTION OF THE DRAWINGS

These and other advantages of the present invention are best understood with reference to the drawings, in which:

FIG. 7 is a functional schematic view of a third propulsion system constructed according to the teachings of the present invention, with oxygen gas from an oxygen plenum being used to pressurize the liquid hydrocarbon fuel storage tanks, and with hot oxygen gas from the oxygen plenum and liquid hydrocarbon fuel being supplied through valves to six attitude control thrusters;

FIG. 8 is a functional schematic view of a fourth propulsion system constructed according to the teachings of the present invention, with helium gas from helium gas storage tanks being used to pressurize the liquid hydrocarbon fuel storage tanks, and with oxygen gas from an attitude control system plenum being supplied through valves to six attitude control thrusters;

FIG. 9 is a functional schematic view of a fifth propulsion system constructed according to the teachings of the present invention, with helium gas from helium gas storage tanks being used to pressurize the liquid hydrocarbon fuel storage tanks, and with oxygen gas from the oxygen plenum being supplied through valves to six attitude control thrusters; and FIG. 10 is a functional schematic view of a sixth propulsion system constructed according to the teachings of the present invention, with helium gas from helium gas storage tanks being used to pressurize the liquid hydrocarbon fuel storage tanks, and with hot oxygen gas from the oxygen heater being supplied through valves to six attitude control thrusters.

DETAILED DESCRIPTION OF THE PREFERRED EMBODIMENT

The preferred embodiment differs from previously known propulsion systems and methods of use in two key respects.

First, the propellants used by the propulsion system and the related method of use of the present invention differ greatly from previously known propellants; the preferred propellants of the present invention are highly refined liquid hydrocarbon fuel, such as, for example, white mineral oil, and oxygen gas. Secondly, the propulsion system and the related method of use of the present invention use an oxygen heater to heat the oxygen gas prior to providing it to thrusters where it is mixed with the liquid hydrocarbon fuel and burned.

These two key aspects of the present invention provide significant advantages in their use in a propulsion system. While such a propulsion system has various applications, the example used herein describes the use of the propulsion system and the related method of use of the present invention in an application including both divert thrusters and attitude control thrusters. Other varied applications of the apparatus and the method of the present invention will be apparent to those skilled in the art after reviewing the following exemplary description.

Figure 1:
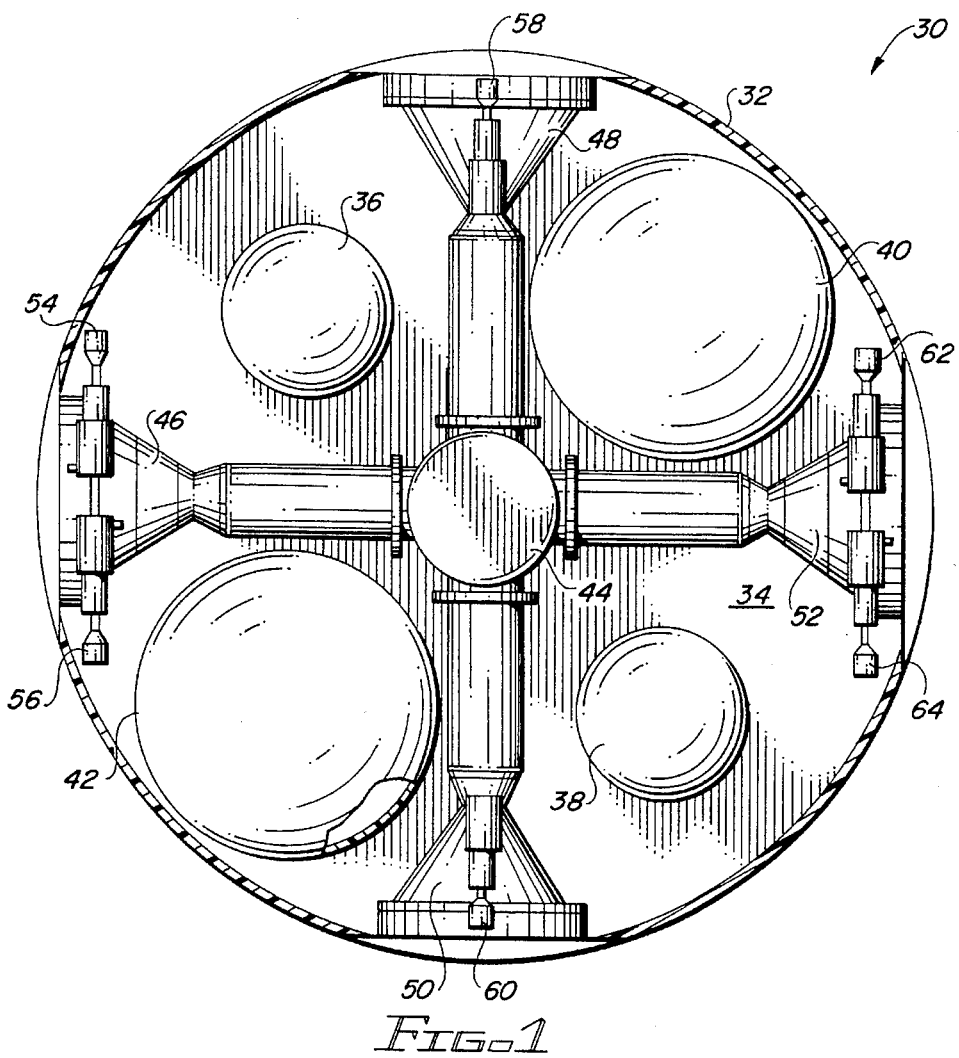
FIG. 1 is a somewhat schematic cross-sectional view of a missile, showing a pair of liquid hydrocarbon fuel storage tanks, a pair of oxygen gas storage tanks, an oxygen heater, four divert thrusters respectively located at the left side, the top, the bottom, and the right side of the missile and oriented radially outwardly, and six attitude control thrusters with two opposing pairs of the attitude control thrusters being located at the left side and the right side of the missile and oriented upwardly and downwardly, and with single attitude control thrusters being located at the top and the bottom of the missile and oriented radially outwardly.

Referring first to FIG. 1, the principal components of the present invention are schematically illustrated in position within the cross-section of a missile 30. The missile 30 is schematically illustrated as a structural tube 32, which is typically made of a high strength, light weight material such as graphite epoxy. Located within the structural tube 32 in the missile 30 is a structural bulkhead 34, on the surface of which structural bulkhead 34 the various principal components of the present invention are mounted. It will be understood by those skilled in the art that these components are mounted within the structural tube 32 of the missile 30.

Centrally located in the four quadrants of the missile 30 are four propellant storage tanks. Located in the upper left and lower right quadrants (as illustrated in FIG. 1) are two liquid hydrocarbon fuel storage tanks 36 and 38, respectively. The liquid hydrocarbon fuel storage tanks 36 and 38 are designed to hold liquid hydrocarbon fuel at atmospheric pressure.

The liquid hydrocarbon fuel storage tanks 36 and 38 are designed to be connected in parallel to supply the propulsion system of the present invention with liquid hydrocarbon fuel in order to establish and maintain a mass balance about the center of gravity. (As will become evident below in conjunction with the discussion of FIGS. 5 through 10, the liquid hydrocarbon fuel storage tanks 36 and 38 also contain a piston mechanism designed to keep the liquid hydrocarbon fuel contained therein at one end of the liquid hydrocarbon fuel storage tanks 36 and 38.)

Located in the upper right and lower left quadrants (as illustrated in FIG. 1) are two oxygen gas storage tanks 40 and 42, respectively. The oxygen gas storage tanks 40 and 42 are designed to hold oxygen gas at a very high pressure, such as, for example, approximately 10,000 psia. The oxygen gas storage tanks 40 and 42 may be made of or be reinforced by a high strength, light weight material such as graphite epoxy. The oxygen gas storage tanks 40 and 42 are also designed to be connected in parallel to supply the propulsion system of the present invention with oxygen gas in order to establish and maintain a mass balance about the center of gravity.

Located in the center of the structural bulkhead 34 in the missile 30 as illustrated in FIG. 1 is an oxygen heater 44. The oxygen heater 44 will function as a gas generator to generate hot oxygen gas, which will be used together with the liquid hydrocarbon fuel as propellants for the divert thrusters of the propulsion system of the present invention. In several of the embodiments of the present invention to be discussed below, the hot oxygen gas generated by the oxygen heater 44 will also be used by the attitude control thrusters of the propulsion system of the present invention to generate thrust.

Located at ninety degree intervals spaced around the missile 30 on the structural bulkhead 34 of the missile 30 are four divert thrusters 46, 48, 50, and 52. The divert thruster 46 is located at the left side of the missile 30 (as illustrated in FIG. 1), the divert thruster 48 is located at the top of the missile 30 (as illustrated in FIG. 1), the divert thruster 50 is located at the bottom of the missile 30 (as illustrated in FIG. 1), and the divert thruster 52 is located at the right side of the missile 30 (as illustrated in FIG. 1). The four divert thrusters 46, 48, 50, and 52 are each oriented radially outwardly with respect to the longitudinal axis of the missile 30 (which runs through the center of the oxygen heater 44).

Six attitude control thrusters 54, 56, 58, 60, 62, and 64 are also located on the structural bulkhead 34 of the missile 30. The attitude control thrusters 54 and 56 are located at the left side of the missile 30 (as illustrated in FIG. 1), with the attitude control thruster 54 being oriented upwardly, and the attitude control thruster 56 being oriented downwardly. The attitude control thruster 58 is located at the top of the missile 30 (as illustrated in FIG. 1) and is oriented upwardly, and the attitude control thruster 60 is located at the bottom of the missile 30 (as illustrated in FIG. 1) and is oriented downwardly. The attitude control thrusters 62 and 64 are located at the right side of the missile 30 (as illustrated in FIG. 1), with the attitude control thruster 62 being oriented upwardly, and the attitude control thruster 64 being oriented downwardly.

Figure 2:
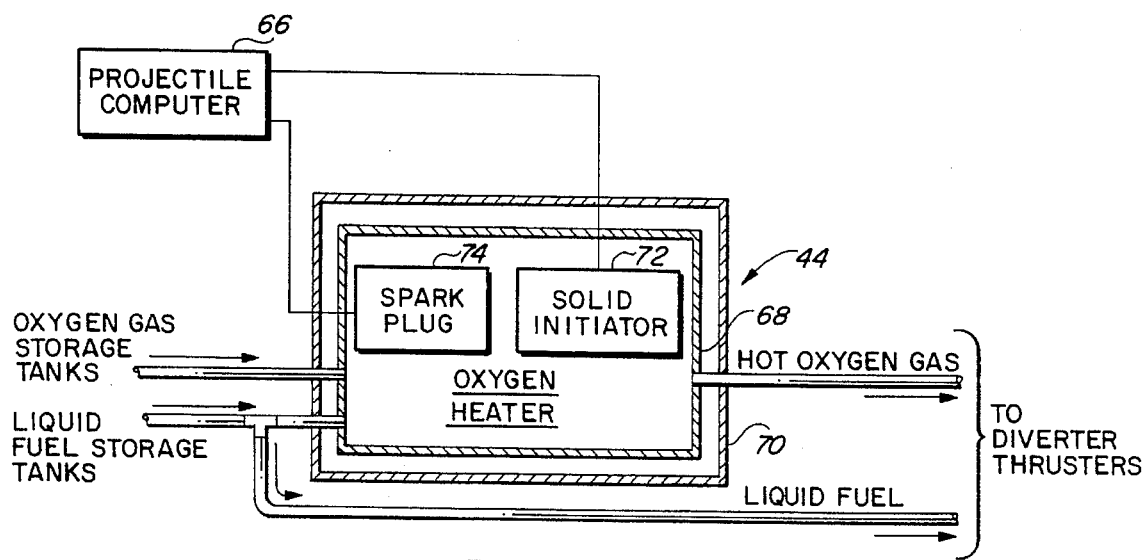
FIG. 2 is a functional schematic of the oxygen heater illustrated in FIG. 1, showing a solid propellant initiator and an optional spark plug located inside a metal pressure vessel and its high temperature overwrap, and also showing a projectile control system operating the solid propellant initiator and the spark plug, and additionally showing the supply of liquid hydrocarbon fuel and the supply of oxygen gas to the oxygen heater, and the supply of liquid hydrocarbon fuel and the supply of hot oxygen gas which will be provided to divert thrusters.

Referring next to FIG. 2, the oxygen heater 44 of FIG. 1 is illustrated in a functional schematic manner which illustrates its interaction with the rest of the propulsion system of the present invention. The operation of the propulsion system is controlled by a projectile computer control system 66, which is also shown schematically in FIG. 2.

The oxygen heater 44 consists essentially of a metal pressure vessel 68 which is wrapped with a high temperature overwrap 70. The metal pressure vessel 68 is typically made of a material which has excellent oxidation resistance at high temperature, such as, for example, a nickel alloy, a cobalt alloy, or iridium. The metal pressure vessel 68 must be capable of easily withstanding the high operational temperature of the oxygen heater 44, which is approximately 1850° F.

Oxygen gas from the oxygen gas storage tanks 40 and 42 (FIG. 1) and liquid hydrocarbon fuel from the liquid hydrocarbon fuel storage tanks 36 and 38 (FIG. 1) are supplied under pressure (the details of which will be discussed later in conjunction with FIG. 5) to the oxygen heater 44. Injection of the oxygen gas is distributed throughout the volume of the interior of the oxygen heater 44 in the preferred embodiment to minimize the quenching effect of the cold oxygen gas entering the oxygen heater 44.

The oxygen heater 44 of the preferred embodiment uses a solid propellant initiator 72 to generate hot gas at the beginning of the operation of the oxygen heater 44. If the solid propellant initiator 72 is utilized in the oxygen heater 44, it is capable of generating hot gas from the oxygen heater 44 even prior to the pressurized supply of oxygen gas and liquid hydrocarbon fuel being supplied to the oxygen heater 44.

Ignition of the solid propellant initiator 72 is initiated by the projectile computer control system 66. It will become apparent below in conjunction with the discussion of FIG. 5 that the projectile computer control system 66 also controls the pressurized supply of oxygen gas and liquid hydrocarbon fuel to the oxygen heater 44.

Also schematically shown in FIG. 2 is a spark plug 74, which may optionally be used to initiate or maintain ignition of oxygen gas and liquid hydrocarbon fuel within the oxygen heater 44 by spark ignition. The spark plug 74 is typically used to maintain ignition of oxygen gas and liquid hydrocarbon fuel within the oxygen heater 44, and can only initiate ignition when pressurized oxygen gas and liquid hydrocarbon fuel are already being supplied to the oxygen heater 44.

In any event, following ignition, the oxygen heater 44 will produce a pressurized flow of hot oxygen gas at a temperature of approximately 1200° F. to 2000° F. Despite the fact that combustion takes place within the oxygen heater 44, only small amounts of the products of combustion are contained in the hot gas generated by the oxygen heater 44. For example, assuming an oxygen to fuel mass flow ratio of 40:1 into the oxygen heater 44, the hot gas produced by the oxygen heater 44 will consist of approximately 89 percent oxygen (in the form of $O_2$), 5.5 percent water $H_2O$), and 5.5 percent carbon dioxide ($CO_2$). For this oxygen to fuel mass flow ratio, the gas temperature within the oxygen heater 44 will be approximately 1850° F.

Since the gas stream generated by the oxygen heater 44 is predominantly oxygen, it is referred to in this specification as hot Oxygen gas even though it does contain small amounts of the other materials mentioned above. Thus, the hot oxygen gas and the liquid hydrocarbon fuel are supplied to the divert thrusters 46, 48, 50, and 52 (illustrated in FIG. 1).

In accordance with the preferred embodiment of the propulsion system and the method of the present invention, two divert thruster designs are presented herein. The first of these divert thrusters is a single stage divert thruster having a single stage in which both ignition and combustion occur, while the second of these divert thrusters is a two stage divert thruster having a first stage in which ignition occurs, and a second stage in which combustion primarily occurs.

Figure 3:
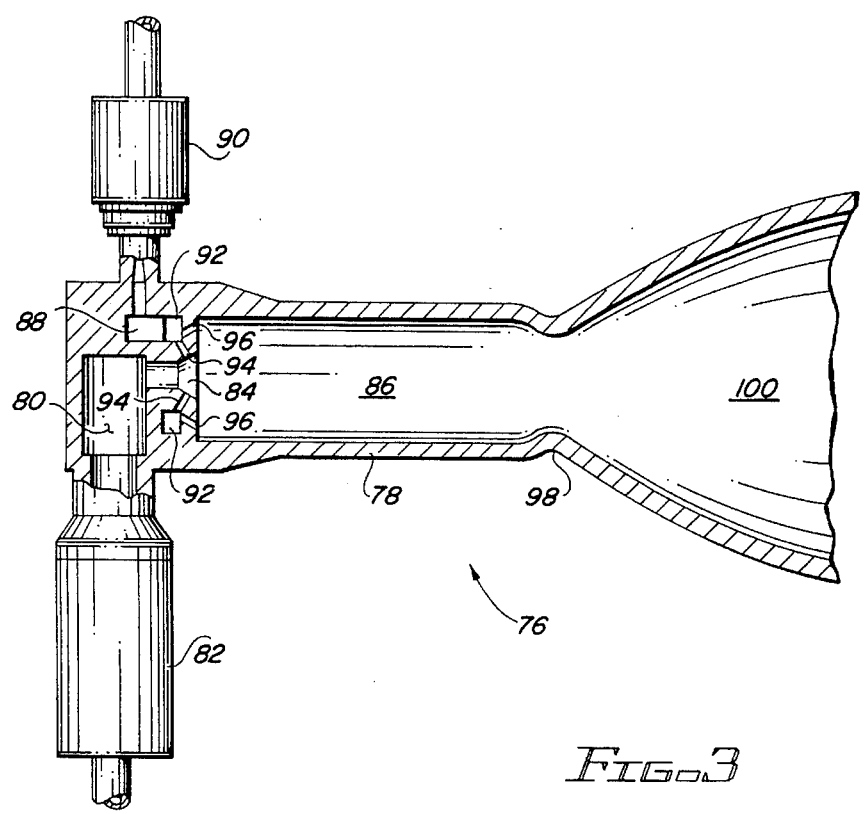
FIG. 3 is a somewhat schematic, partially cutaway view of a single stage divert thruster having a single stage in which both ignition and combustion occur, and showing the supply valves through which liquid hydrocarbon fuel and hot oxygen gas are supplied to the divert thruster.

Referring now to FIG. 3, the first of these divert thruster designs is presented. A single stage divert thruster 76 in which both ignition and combustion occur in a single stage is illustrated in FIG. 3. The single stage divert thruster 76 consists of a housing member 78, which is shown as a single segment in the simplified drawing of FIG. 3. In reality, the housing member 78 would include a number of different components, the general construction of which is readily apparent to those skilled in the art.

Located inside the housing member 78 at the left side thereof as shown in FIG. 3 is an oxygen gas inlet chamber 80. Hot oxygen gas is supplied to the oxygen gas inlet chamber 80 through an oxidizer valve 82 whenever the oxidizer valve 82 is opened. When hot oxygen gas is allowed to enter the oxygen gas inlet chamber 80 through the oxidizer valve 82, it can only exit the oxygen gas inlet chamber 80 through an oxygen gas injector orifice 84, from which it enters at the left end of a cylindrical ignition/combustion chamber 86 which is located inside the housing member 78. It will be appreciated by those skilled in the art that when the oxidizer valve 82 is opened, hot oxygen gas will flow through the oxygen gas injector orifice 84 into the ignition/combustion chamber 86 at high speed.

Also located inside the housing member 78 at the left side and near the top thereof as shown in FIG. 3 is a small fuel inlet chamber 88. Liquid hydrocarbon fuel is supplied to the fuel inlet chamber 88 through a fuel valve 90 whenever the fuel valve 90 is opened. The right side of the fuel inlet chamber 88 is in fluid communication with an annular fuel chamber 92, which surrounds and is spaced away from the oxygen gas injector orifice 84.

Some of the liquid hydrocarbon fuel in the annular fuel chamber 92 is injected through fuel orifices 94 into the flow of hot oxygen gas flowing through the oxygen gas injector orifice 84. The liquid hydrocarbon fuel so injected into the hot oxygen gas flow in the oxygen gas injector orifice 84 will create a mixture of small fuel droplets and oxygen. The fuel orifices 94 may either be single or doublet orifices.

Some of the liquid hydrocarbon fuel contained in the annular fuel chamber 92 will be injected through orifices 96 leading into the ignition/combustion chamber 86, at locations which are not directly in the flow path of the hot oxygen gas from the oxygen gas injector orifice 84. The liquid hydrocarbon fuel injected through the orifices 96 will initially act to cool the interior walls of the housing member 78 which form the ignition/combustion chamber 86, and will then form droplets passing into the ignition/combustion chamber 86 itself.

As the liquid hydrocarbon fuel is injected into the hot oxygen gas flow, it will be ignited by contact with the hot oxygen gas itself. It may be noted that the temperature of the hot oxygen gas is selected to ensure ignition within the ignition/combustion chamber 86. This ignition will occur at or near the left side of the ignition/combustion chamber 86, and the droplets of liquid hydrocarbon fuel will be burned in the ignition/combustion chamber 86. As the gasses produced by the combustion process expand, they pass through a throat 98 at the right end of the ignition/combustion chamber 86 into an exhaust cone 100, from which they exit the single stage divert thruster 76 while producing thrust.

Figure 4:
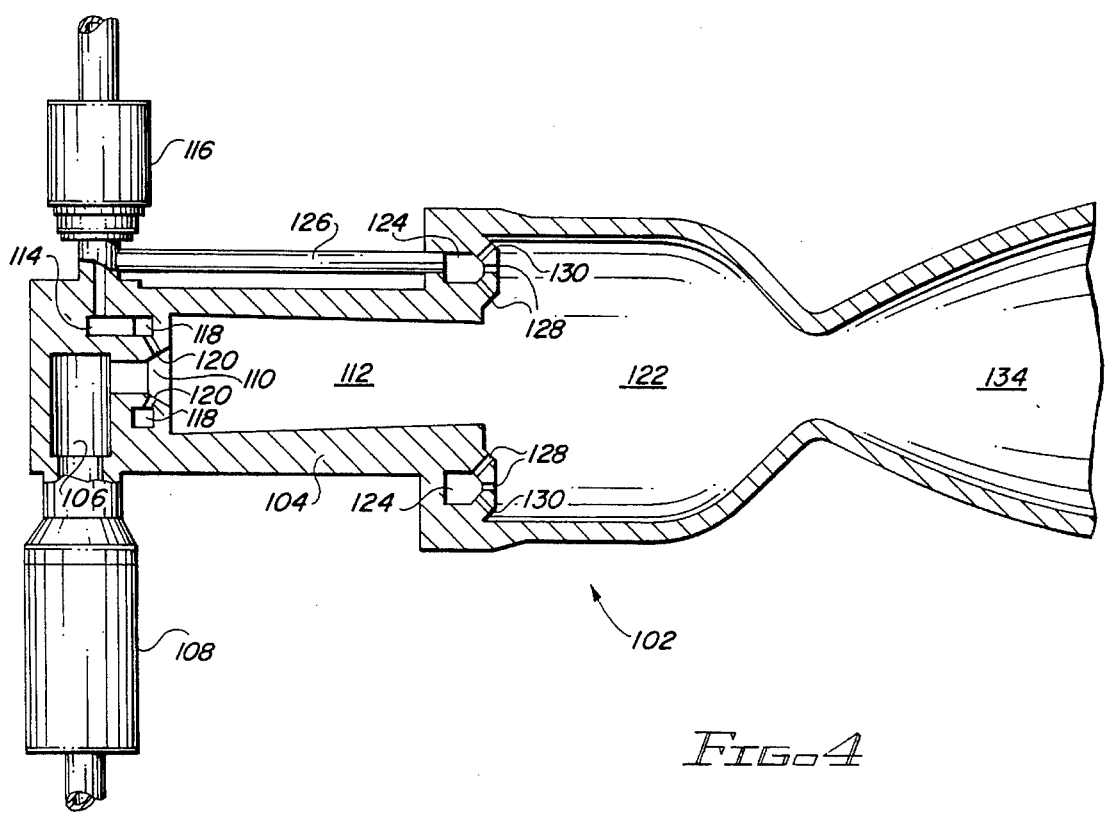
FIG. 4 is a somewhat schematic, partially cutaway view of a two stage divert thruster having a first stage in which ignition occurs, and a second stage in which combustion occurs, and showing the supply valves through which liquid hydrocarbon fuel and hot oxygen gas are supplied to the divert thruster.

Referring next to FIG. 4, the second of the divert thruster designs of the present invention is presented. A two stage divert thruster 102 in which ignition occurs in a first stage and combustion occurs primarily in a second stage is illustrated in FIG. 4. The two stage divert thruster 102 consists of a housing member 104, which is shown as a single segment in the simplified drawing of FIG. 4. In reality, the housing member 104 would include a number of different components, the general construction of which is readily apparent to those skilled in the art.

Located inside the housing member 104 at the left side thereof as shown in FIG. 4 is an oxygen gas inlet chamber 106. Hot oxygen gas is supplied to the oxygen gas inlet chamber 106 through an oxidizer valve 108 whenever the oxidizer valve 108 is opened. When hot oxygen gas is allowed to enter the oxygen gas inlet chamber 106 through the oxidizer valve 108, it can only exit the oxygen gas inlet chamber 106 through an oxygen gas injector orifice 110, from which it enters at the left end of an essentially cylindrical ignition chamber 112 which is located inside the housing member 104. It will be appreciated by those skilled in the art that when the oxidizer valve 108 is opened, hot oxygen gas will flow through the oxygen gas injector orifice 110 into the ignition chamber 112 at high speed.

Also located inside the housing member 104 at the left side and near the top thereof as shown in FIG. 4 is a small fuel inlet chamber 114. Liquid hydrocarbon fuel is supplied to the fuel inlet chamber 114 through a fuel valve 116 whenever the fuel valve 116 is opened. The right side of the fuel inlet chamber 114 is in fluid communication with an annular fuel chamber 118, which surrounds and is spaced away from the oxygen gas injector orifice 110.

The liquid hydrocarbon fuel contained in the annular fuel chamber 118 is injected through fuel orifices 120 into the flow of hot oxygen gas flowing through the oxygen gas injector orifice 110. The liquid hydrocarbon fuel so injected into the hot oxygen gas flow in the oxygen gas injector orifice 110 will create a mixture of small fuel droplets and oxygen. The fuel orifices 120 may either be single or doublet orifices.

As the liquid hydrocarbon fuel is injected into the hot oxygen gas flow in the oxygen gas injector orifice 110, it will be ignited by contact with the hot oxygen gas itself. It may be noted that the length of the cylindrical ignition chamber 112 and the temperature of the hot oxygen gas is selected to ensure ignition within the cylindrical ignition chamber 112. The ignition will occur at or near the left side of the cylindrical ignition chamber 112, and the droplets of liquid hydrocarbon fuel will thus be ignited in the cylindrical ignition chamber 112.

The hot gas in the cylindrical ignition chamber 112 will exit the cylindrical ignition chamber 112 at the right end thereof, from which it enters a larger diameter combustion chamber 122. The mixture ratio of liquid hydrocarbon fuel and hot oxygen gas injected into the cylindrical ignition chamber 112 is selected to produce a sufficiently hot gas temperature which will ensure ignition of the remainder of the liquid hydrocarbon fuel in the combustion chamber 122, as will become evident in the following description.

Located to the left of the left side of the combustion chamber 122 and disposed within the housing member 104 is an annular fuel chamber 124 which surrounds and is spaced away from the right end of the cylindrical ignition chamber 112. Liquid hydrocarbon fuel is supplied through a supply tube 126 to the annular fuel chamber 124 whenever the fuel valve 116 is opened.

Some of the liquid hydrocarbon fuel in the annular fuel chamber 124 is injected through fuel orifices 128 into the flow of hot gas flowing from the cylindrical ignition chamber 112 into the combustion chamber 122. The liquid hydrocarbon fuel so injected into the hot gas flow in the combustion chamber 122 will create a mixture of small fuel droplets and oxygen. The fuel orifices 128 may either be single or doublet orifices.

Some of the liquid hydrocarbon fuel contained in the annular fuel chamber 124 will be injected through orifices 130 leading into the combustion chamber 122, at locations which are not directly in the flow path of the hot gas entering the combustion chamber 122 from the cylindrical ignition chamber 112. The liquid hydrocarbon fuel injected through the orifices 130 will initially act to cool the interior walls of the housing member 104 which form the combustion chamber 122, and will then form droplets passing into the combustion chamber 122 itself.

As the liquid hydrocarbon fuel is injected into the hot gas flow, it will be ignited by contact with the hot oxygen gas itself. As previously mentioned, the mixture ratio of liquid hydrocarbon fuel and hot oxygen gas injected into the cylindrical ignition chamber 112 produces a sufficiently hot gas temperature to ensure ignition of the liquid hydrocarbon fuel in the combustion chamber. This ignition will occur at or near the left side of the combustion chamber 122, and the droplets of liquid hydrocarbon fuel will be burned in the combustion chamber 122. As the gasses produced by the combustion process expand, they pass through a throat 132 at the right end of the combustion chamber 122 into an exhaust cone 134, from which they exit the two stage divert thruster 102 while producing thrust.

Figure 5:
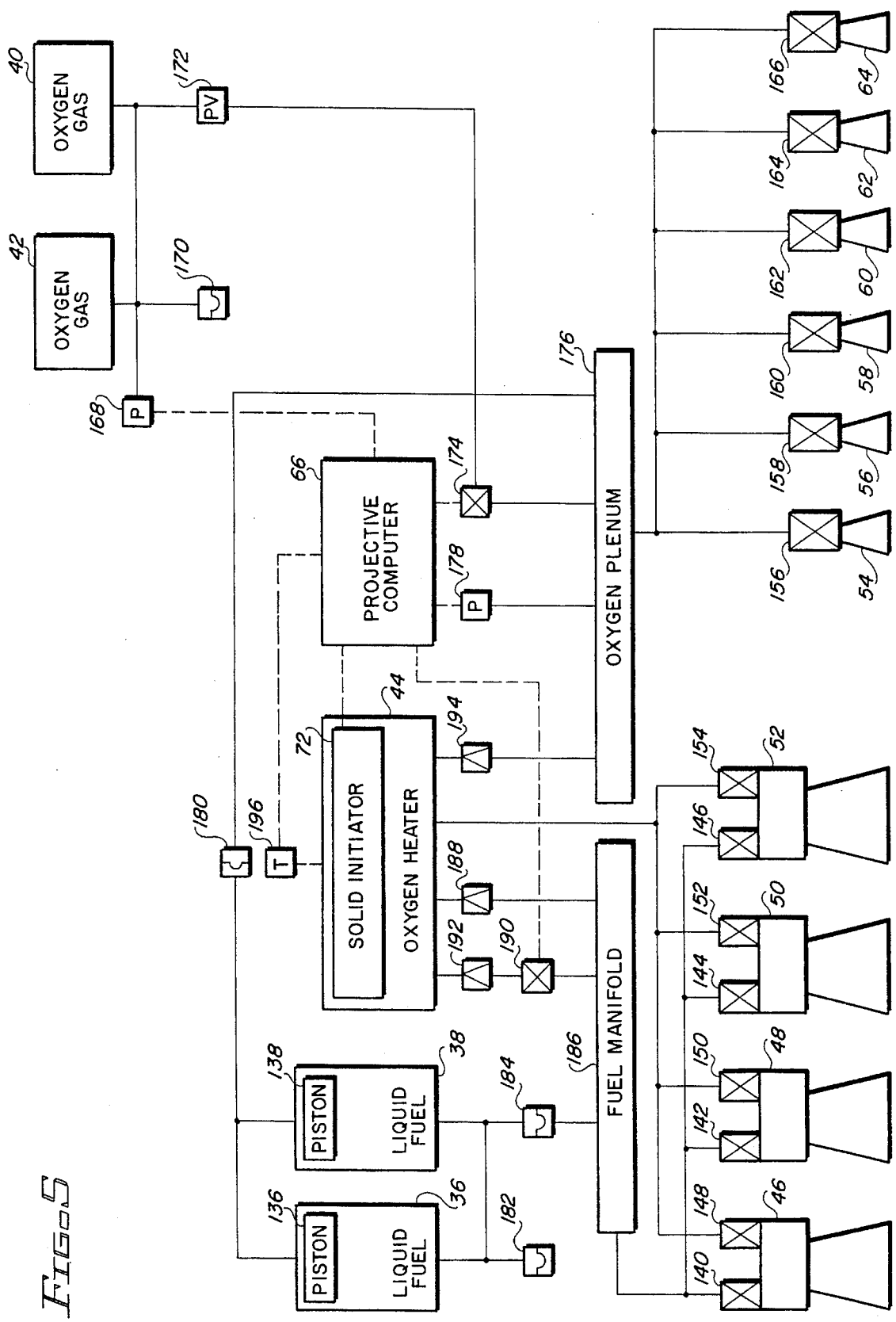
FIG. 5 is a functional schematic view of a first propulsion system constructed according to the teachings of the present invention, with oxygen gas from an oxygen plenum being used to pressurize the liquid hydrocarbon fuel storage tanks, and with oxygen gas from the oxygen plenum being supplied through valves to six attitude control thrusters.

Referring next to FIG. 5, the first of six exemplary embodiments of the propulsion system of the present invention is illustrated. These six exemplary embodiments each contain different implementations presenting different combinations of features and advantages. All six of the embodiments illustrated in FIGS. 5 through 10 contain the principal components illustrated in FIG. 1: the liquid hydrocarbon fuel storage tanks 36 and 38, the oxygen gas storage tanks 40 and 42, the oxygen heater 44, the divert thrusters 46, 48, 50, and 52, the attitude control thrusters 54, 56, 58, 60, 62, and 64, the projectile computer control system 66.

Referring now specifically to FIG. 5, it may be seen that the liquid hydrocarbon fuel storage tanks 36 and 38 function as cylinders in which pistons are located to force liquid hydrocarbon fuel from outlets in the liquid hydrocarbon fuel storage tanks 36 and 38. Specifically, the liquid hydrocarbon fuel storage tank 36 has a piston 136 contained therein, and the liquid hydrocarbon fuel storage tank 38 has a piston 138 contained therein. The pistons 136 and 138 in the liquid hydrocarbon fuel storage tanks 36 and 38, respectively, are driven by pressurized gas entering through inlets in the liquid hydrocarbon fuel storage tanks 36 and 38.

The inlets of the liquid hydrocarbon fuel storage tanks 36 and 38 are tied together, and the outlets of the liquid hydrocarbon fuel storage tank 36 and 38 are tied together. (Note that the systems of FIGS. 6 through 10, which will be discussed below, each have the same interconnections and operation of their respective liquid hydrocarbon fuel storage tanks 36 and 38.)

Referring again to FIG. 5, the outlets of the oxygen gas storage tank 40 and 42 are tied together. (Note that the propulsion systems of FIGS. 6 through 10, which will be discussed below, each have the same interconnections of their respective oxygen gas storage tank 40 and 42.)

Referring once again to FIG. 5, the divert thrusters 46, 48, 50, and 52 each have a fuel valve and an oxidizer valve. Specifically, the divert thruster 46 has a fuel valve 140 and an oxidizer valve 148, the divert thruster 48 has a fuel valve 142 and an oxidizer valve 150, the divert thruster 50 has a fuel valve 144 and an oxidizer valve 152, and the divert thruster 52 has a fuel valve 146 and an oxidizer valve 154. Operation of the fuel valves 140, 142, 144, and 146 and the oxidizer valves 148, 150, 152, and 154 are all controlled by the projectile computer control system 66. (Note that the propulsion systems of FIGS. 6 through 10, which will be discussed below, each have the same fuel valve and oxidizer valve arrangement on their respective divert thrusters 46, 48, 50, and 52.)

Referring still again to FIG. 5, the attitude control thrusters 54, 56, 58, 60, 62, and 64 are jets in their operation, using only a single pressurized fluid to provide thrust. As such, they each require only a single control valve. Specifically, the attitude control thruster 54 has a control valve 156, the attitude control thruster 56 has a control valve 158, the attitude control thruster 58 has a control valve 160, the attitude control thruster 60 has a control valve 162, the attitude control thruster 62 has a control valve 164, and the attitude control thruster 64 has a control valve 166. Operation of the control valves 156, 158, 160, 162, 164, and 166 are all controlled by the projectile computer control system 66. (Note that the propulsion systems of FIGS. 6 and 8 through 10, which will be discussed below, each have the same control valve arrangement on their respective attitude control thrusters 54, 56, 58, 60, 62, and 4. Note, however, that the propulsion system of FIG. 7 has a different attitude control thruster arrangement, which will be specifically described below in conjunction with the discussion of FIG. 7.)

Referring now once more to FIG. 5, as noted above the outlets of the oxygen gas storage tanks 40 and 42 are tied together. Oxygen gas is stored in the oxygen gas storage tanks 40 and 42 at high pressure, typically on the order of approximately 10,000 psia. Pressure in the oxygen gas storage tanks 40 and 42 is monitored by a pressure transducer 168, which supplies a pressure signal which is monitored by the projectile computer control system 66.

For safety purposes, a burst disk 170 is installed on the outlets from the oxygen gas storage tanks 40 and 42. The burst disk 170 is designed to rupture at a pressure higher than the maximum oxygen gas pressure in storage or operation of the propulsion system, but lower than the burst pressure of the oxygen gas storage tanks 40 and 42. In the event of the propulsion system being engulfed in a fire, the pressure in the oxygen gas storage tanks 40 and 42 will rise until the burst disk 170 ruptures. The oxygen gas will then be discharged from the oxygen gas storage tanks 40 and 42, perhaps temporarily increasing the intensity of the fire, but avoiding the rupture and fragmentation of the oxygen gas storage tanks 40 and 42.

A pyrovalve 172 is installed between the outlets from the oxygen gas storage tanks 40 and 42 and a solenoid pressure control valve 174. The pyrovalve 172 is made for one-time operation, and once opened by a signal from the projectile computer control system 66 will remain open to allow the passage of oxygen gas therethrough. The pyrovalve 172 functions to isolate the rest of the system from the oxygen gas during storage.

Once the pyrovalve 172 has been opened, the solenoid pressure control valve 174 will be opened by the projectile computer control system 66 to allow oxygen gas to flow into an oxygen plenum 176. As an added safety feature, note that if the pyrovalve 172 were fired accidentally, or by the occurrence of a fire, high pressure oxygen gas would still be isolated from the oxygen plenum 176 by the solenoid pressure control valve 174. Pressure in the oxygen plenum 176 is monitored by a pressure transducer 178, which supplies a pressure signal which is monitored by the projectile computer control system 66. Using this pressure signal, the projectile computer control system 66 will operate the solenoid pressure control valve 174 to control the pressure of oxygen gas in the oxygen plenum 176.

Typically, pressure in the oxygen plenum 176 is maintained at approximately 1000 psi. Whenever the pressure in the oxygen plenum 176 drops below the desired pressure, the projectile computer control system 66 will cause the solenoid pressure control valve 174 to be actuated for a short duration, typically a few milliseconds, to allow more oxygen gas to be injected into the oxygen plenum 176, thereby raising the pressure in the oxygen plenum 176.

(Note that the propulsion systems of FIGS. 6 through 10, which will be discussed below, each have the same arrangements of the pressure transducer 168, the burst disk 170, the pyrovalve 172, the solenoid pressure control valve 174, the oxygen plenum 176, and the pressure transducer the pressure transducer 178 as contained in the propulsion system of FIG. 5, and are operated in the same manner by their respective projectile computer control systems 66.)

Referring once again to FIG. 5, as noted above, the inlets and the outlets of the liquid hydrocarbon fuel storage tanks 36 and 38 are tied together. The liquid hydrocarbon fuel, which is white mineral oil in the preferred embodiment, is stored in the liquid hydrocarbon fuel storage tanks 36 and 38 at low pressure, typically on the order of approximately 1 atmosphere.

An outlet from the oxygen plenum 176 is connected to the inlets of the liquid hydrocarbon fuel storage tanks 36 and 38 with a burst disk 180 installed therein. The burst disk 180 functions to isolate the oxygen plenum 176 from the liquid hydrocarbon fuel storage tanks 36 and 38 during long term storage. The burst disk 180 is designed to rupture at a pressure lower than the operating pressure of the oxygen plenum 176, so that when the oxygen plenum 176 is pressurized by initially opening the solenoid pressure control valve 174, the burst disk 180 will rupture and allow oxygen gas to enter the inlets of the liquid hydrocarbon fuel storage tanks 36 and 38, thereby pressurizing the liquid hydrocarbon fuel storage tanks 36 and 38 to approximately 1000 psi.

(Note that the propulsion systems of FIGS. 6 and 7, which will be discussed below, each have the same burst disk 180 arrangement, and use oxygen gas from the oxygen plenum 176 to pressurize their respective liquid hydrocarbon fuel storage tanks 36 and 38 in the same manner as the propulsion system of FIG. 5. Note, however, that the propulsion system of FIGS. 8 through 10 have a different arrangement used to pressurize their respective liquid hydrocarbon fuel storage tanks 36 and 38, which arrangement will be described below in conjunction with the discussion of FIG. 8.)

Referring again now to FIG. 5, for safety purposes, a vent burst disk 182 is installed on the outlets from the liquid hydrocarbon fuel storage tanks 36 and 38. The vent burst disk 182 is designed to rupture at a pressure higher than the gas pressure used to pressurize the inlets of the liquid hydrocarbon fuel storage tanks 36 and 38, but lower than the burst pressure of the liquid hydrocarbon fuel storage tanks 36 and 38. In the event of the propulsion system being engulfed in a fire, the pressure in the liquid hydrocarbon fuel storage tanks 36 and 38 will rise until the vent burst disk 182 ruptures. The liquid hydrocarbon fuel will then be discharged from the liquid hydrocarbon fuel storage tanks 36 and 38, thereby avoiding the rupture and fragmentation of the liquid hydrocarbon fuel storage tanks 36 and 38.

When the liquid hydrocarbon fuel storage tanks 36 and 38 are initially pressurized, a burst disk 184 will rupture, allowing liquid hydrocarbon fuel to flow therethrough to a fuel manifold 186. Pressure in the fuel manifold 186 is thus maintained at approximately the same level as the pressure in the oxygen plenum 176, or approximately 1000 psi. Prior to pressurization of the liquid hydrocarbon fuel storage tanks 36 and 38, the liquid hydrocarbon fuel is isolated in the liquid hydrocarbon fuel storage tanks 36 and 38 by the burst disk 184. The burst disk 184 will rupture at a pressure less than the pressure at which the liquid hydrocarbon fuel storage tanks 36 and 38 are pressurized. Typically, the burst disk 184 will rupture at a pressure on the order of approximately 200 psi. (Note that the propulsion systems of FIGS. 6 through 10, which will be discussed below, each have the same arrangements and operational characteristics of the vent burst disk 182 and the burst disk 184 as contained in the propulsion system of FIG. 5.)

Referring once again to FIG. 5, the liquid hydrocarbon fuel is also supplied under pressure from the fuel manifold 186 to a check valve 188, through which the liquid hydrocarbon fuel is injected into the oxygen heater 44. The check valve 188 functions to ensure one-way flow therethrough. Liquid hydrocarbon fuel is also supplied under pressure from the fuel manifold 186 to a solenoid pressure control valve 190, which, when actuated by the projectile computer control system 66, will allow additional liquid hydrocarbon fuel to be supplied through a check valve 192, through which the additional liquid hydrocarbon fuel is injected into the oxygen heater 44.

The check valve 192 also functions to ensure one-way flow therethrough. The details of actuation of the solenoid pressure control valve 190 will be discussed below. (Note that the propulsion systems of FIGS. 6 through 10, which will be discussed below, each have the same arrangements and operational characteristics of the check valve 188, the solenoid pressure control valve 190, and the check valve 192 as contained in FIG. 5.)

Referring once again to FIG. 5, oxygen gas is supplied under pressure from the oxygen plenum 176 to a check valve 194, through which the oxygen gas is injected into the oxygen heater 44. The check valve 194 functions to ensure one-way flow therethrough.

In the preferred embodiment, the cracking pressure differential required to open the check valves 188 and 194 can be adjusted so that the check valve 188 will open to allow liquid hydrocarbon fuel into the oxygen heater 44 before the check valve 192 will open to allow oxygen gas into the oxygen heater 44, assuming approximately the same pressures in the oxygen plenum 176 and the fuel manifold 186. This will aid the combustion of the liquid hydrocarbon fuel whenever it is injected, without local quenching by the cold oxygen gas flowing into the oxygen heater 44.

The divert thrusters 46, 48, 50, and 52 require carefully controlled, highly predictable mass flow rates of the liquid hydrocarbon fuel and the oxygen gas in order to meet the tolerance requirements for thrust and mixture ratio. The pressure and the temperature of the hot oxygen gas must both be carefully controlled in order to provide the desired oxygen mass flow rate to the divert thrusters 46, 48, 50, and 52. The pressure in the oxygen heater 44 will be accurately controlled at all times by the action of the check valves 188 and 194, which will keep the pressure in the oxygen heater 44 approximately equal to the pressure of the oxygen plenum 176, less the cracking pressure of the check valves 188 and 194.

However, the temperature of the oxygen gas flow from the oxygen plenum 176 to the oxygen heater 44 will be more variable due to the effects of two factors. The first of these factors is the ambient temperature. The second factor is the temperature decay inside the oxygen gas storage tanks 40 and 42 due to isentropic expansion as the oxygen gas is used.

The base liquid hydrocarbon fuel flow rate into the oxygen heater 44 will be controlled by the check valve 188. The temperature in the oxygen heater 44 will be continuously monitored by a temperature sensor 196, which supplies a temperature signal which is continuously monitored by the projectile computer control system 66. If the temperature in the oxygen heater 44 needs to be increased, the solenoid pressure control valve 190 will be pulsed by the projectile computer control system 66 to provide additional liquid hydrocarbon fuel to the oxygen heater 44 via the check valve 192, where the liquid hydrocarbon fuel will immediately be combusted in the high pressure, high temperature oxygen gas.

The mixture ratio of oxygen gas to liquid hydrocarbon fuel injected into the oxygen heater 44 will be selected to produce a hot oxygen gas temperature which will be sufficiently hot to ensure rapid ignition of the divert thrusters 46, 48, 50, and 52 whenever the liquid hydrocarbon fuel and the hot oxygen gas are mixed in the divert thrusters 46, 48, 50, and 52. The check valves 188 and 192 on the liquid hydrocarbon fuel lines supplying the oxygen heater 44 and the check valve 194 on the oxygen gas line supplying the oxygen heater 44 will prevent any backflow of the hot oxygen gas therethrough into the fuel manifold 186 or the oxygen plenum 176 in case of a brief period of excess pressure in the oxygen heater 44.

The check valves 188, 192, and 194 are sized to provide a mass flow ratio of oxygen gas and liquid hydrocarbon fuel which, when combusted in the oxygen heater 44, will produce a gas temperature of approximately 1200° F. to 2000° F. The chemical composition of the hot oxygen gas in the oxygen heater 44 will be primarily oxygen, with only small amounts of products of combustion (hence its shorthand description as "hot oxygen gas").

For the example given above in which an oxygen to fuel mass flow ratio of 40:1 is supplied to the oxygen heater 44, the hot gas produced by the oxygen heater 44 will consist of approximately 89 percent oxygen (in the form of $O_2$), 5.5 percent water ($H_2O$), and 5.5 percent carbon dioxide ($CO_2$). For this oxygen to fuel mass flow ratio, the gas temperature within the oxygen heater 44 will be approximately 1850° F.

It will thus be appreciated by those skilled in the art that the gas temperature of the hot oxygen gas supplied by the oxygen heater 44, as well as its pressure, may be carefully controlled by the projectile computer control system 66 to produce the desired characteristics. (Note that the operation of the propulsion systems of FIGS. 6 through 10, which will be discussed below, each have the same arrangements and operational characteristics of the oxygen heater 44, and are controlled in the same manner as has been described in reference to the propulsion system of FIG. 5.)

Referring once again to FIG. 5, liquid hydrocarbon fuel is supplied under pressure from the fuel manifold 186 to the fuel valves 140, 142, 144, and 146 of the divert thrusters 46, 48, 50, and 52, respectively. In a similar manner, hot oxygen gas is supplied under pressure from the oxygen heater 44 to the oxidizer valves 148, 150, 152, and 154 of the divert thrusters 46, 48, 50, and 52, respectively. (Note that for the operation of the propulsion systems of FIGS. 6 through 10, which will be discussed below, liquid hydrocarbon fuel and hot oxygen gas are supplied to the divert thrusters 46, 48, 50, and 52 in the same manner as is accomplished in the propulsion system of FIG. 5.)

The rest of the propulsion system in FIG. 5 is quite simple in construction. Oxygen gas is supplied under pressure from the oxygen plenum 176 to the control valves 156, 158, 160, 162, 164, and 166 of the attitude control thrusters 54, 56, 58, 60, 62, and 64, respectively. The attitude control thrusters 54, 56, 58, 60, 62, and 64 are jets in operation, since the release of the oxygen gas supplied from the oxygen plenum 176 is their sole source of thrust.

This completes the description of the propulsion system of FIG. 5, which may be characterized as having its liquid hydrocarbon fuel storage tanks 36 and 38 pressurized by oxygen gas from the oxygen plenum 176, and as having its attitude control thrusters 54, 56, 58, 60, 62, and 64 operated by (cold) oxygen gas from the oxygen plenum 176.

With regard generally to FIGS. 6 through 10, a number of the components of these propulsion systems and their methods of operation are identical to the construction and the method of operation of the propulsion system of FIG. 5, as made clear above with reference to FIG. 5. Thus, only those portions of the propulsion systems of FIGS. 6 through 10 which differ in construction and operation from the propulsion system of FIG. 5 will be discussed below in detail.

Figure 6:
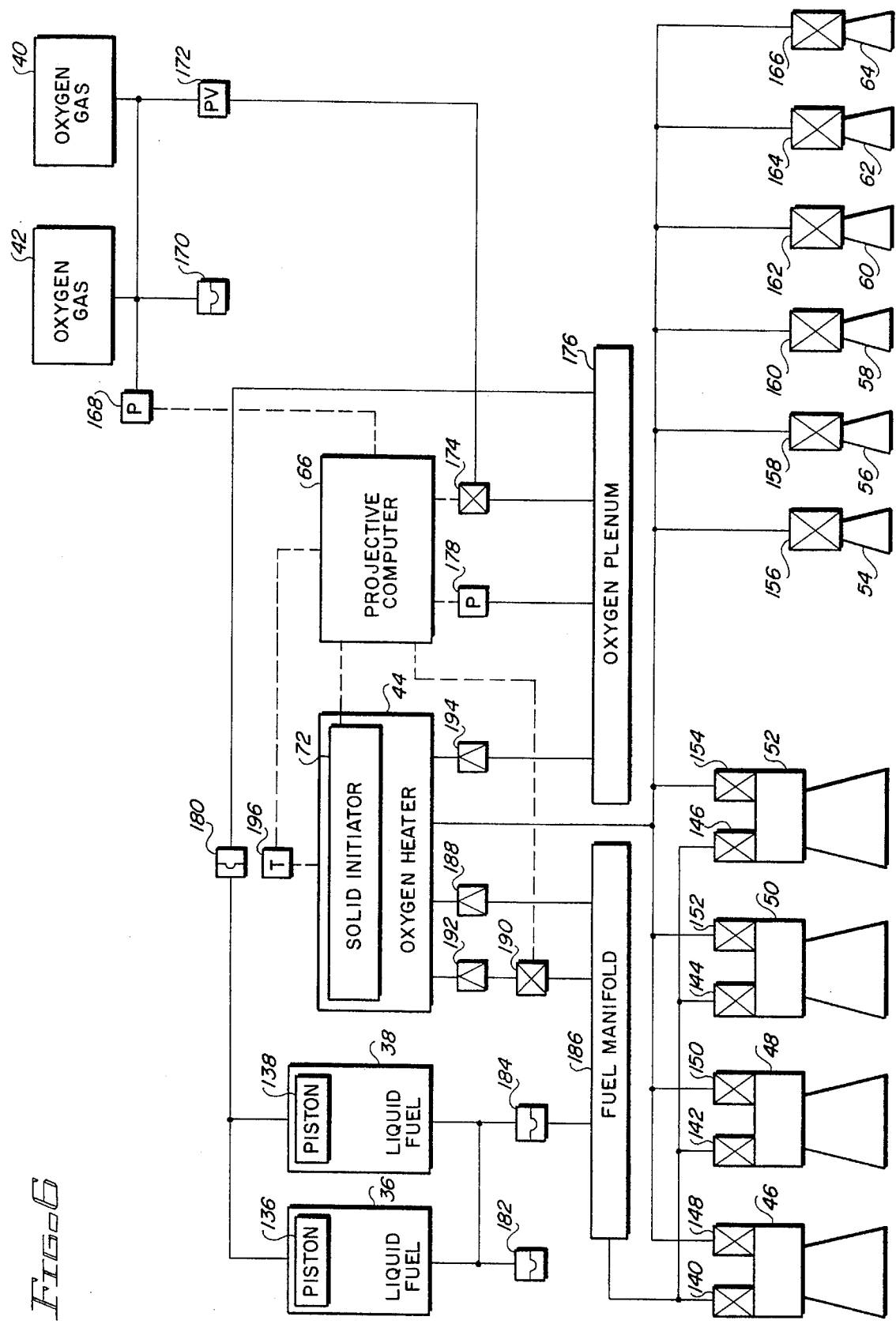
FIG. 6 is a functional schematic view of a second propulsion system constructed according to the teachings of the present invention, with oxygen gas from an oxygen plenum being used to pressurize the liquid hydrocarbon fuel storage tanks, and with hot oxygen gas from the oxygen heater being supplied through valves to six attitude control thrusters.

Referring now specifically to FIG. 6, hot oxygen gas is supplied under pressure from the oxygen heater 44 to the control valves 156, 158, 160, 162, 164, and 166 of the attitude control thrusters 54, 56, 58, 60, 62, and 64, respectively. The attitude control thrusters 54, 56, 58, 60, 62, and 64 are again jets in operation, since the release of the hot oxygen gas supplied from the oxygen heater 44 is their sole source of thrust.

This completes the description of the propulsion system of FIG. 6, which may be characterized as having its liquid hydrocarbon fuel storage tanks 36 and 38 pressurized by oxygen gas from the oxygen plenum 176, and as having its attitude control thrusters 54, 56, 58, 60, 62, and 64 operated by hot oxygen gas from the oxygen heater 44.

Referring now specifically to FIG. 7, instead of the attitude control thrusters 54, 56, 58, 60, 62, and 64, which operate functionally as jets, the propulsion system depicted instead uses true bipropellant thrusters similar to the divert thrusters 46, 48, 50, and 52. Six attitude control thrusters 200, 202, 204, 206, 208, and 210 are thus used.

The attitude control thrusters 200, 202, 204, 206, 208, and 210 each have a fuel valve and an oxidizer valve. Specifically, the attitude control thruster 200 has a fuel valve 212 and an oxidizer valve 224, the attitude control thruster 202 has a fuel valve 214 and an oxidizer valve 226, the attitude control thruster 204 has a fuel valve 216 and an oxidizer valve 228, the attitude control thruster 206 has a fuel valve 218 and an oxidizer valve 230, the attitude control thruster 208 has a fuel valve 220 and an oxidizer valve 232, and the attitude control thruster 210 has a fuel valve 222 and an oxidizer valve 234. Operation of the fuel valves 212, 214, 216, 218, 220, and 222 and the oxidizer valves 224, 226, 228, 230, 232, and 234 are all controlled by the projectile computer control system 66.

Liquid hydrocarbon fuel is supplied under pressure from the fuel manifold 186 to the fuel valves 212, 214, 216, 218, 220, and 222 of the attitude control thrusters 200, 202, 204, 206, 208, and 210, respectively. In a similar manner, hot oxygen gas is supplied under pressure from the oxygen heater 44 to the oxidizer valves 224, 226, 228, 230, 232, and 234 of the attitude control thrusters 200, 202, 204, 206, 208, and 210, respectively.

This completes the description of the propulsion system of FIG. 7, which may be characterized as having its liquid hydrocarbon fuel storage tanks 36 and 38 pressurized by oxygen gas from the oxygen plenum 176, and as having its attitude control thrusters 200, 202, 204, 206, 208, and 210 being bipropellant operated using liquid hydrocarbon fuel from the fuel manifold 186 and hot oxygen gas from the oxygen heater 44.

Referring now specifically to FIG. 8, the inlets of the liquid hydrocarbon fuel storage tanks 36 and 38 are not pressurized by oxygen gas from the oxygen plenum 176, but rather by an independent helium gas system first illustrated in FIG. 8. Helium gas is stored in a helium gas storage tank 236 at high pressure, typically on the order of approximately 10,000 psia. Pressure in the helium gas storage tank 236 is monitored by a pressure transducer 238, which supplies a pressure signal which is monitored by the projectile computer control system 66.

For safety purposes, a burst disk 240 is installed on the outlet from the helium gas storage tank 236. The burst disk 240 is designed to rupture at a pressure higher than the maximum helium gas pressure in storage or operation of the propulsion system, but lower than the burst pressure of the helium gas storage tank 236. In the event of the propulsion system being engulfed in a fire, the pressure in the helium gas storage tank 236 will rise until the burst disk 240 ruptures. The helium gas will then be discharged from the helium gas storage tank 236, thereby avoiding the rupture and fragmentation of the helium gas storage tank 236.

A pyrovalve 242 is installed between the outlet from the helium gas storage tank 236 and a solenoid pressure control valve 244. The pyrovalve 242 is made for one-time operation, and once opened by a signal from the projectile computer control system 66 will remain open to allow the passage of helium gas therethrough. The pyrovalve 242 functions to isolate the liquid hydrocarbon fuel storage tanks 36 and 38 from the helium gas during storage.

Once the pyrovalve 242 has been opened, the solenoid pressure control valve 244 will be opened by the projectile computer control system 66 to allow helium gas to flow into the inlets of the liquid hydrocarbon fuel storage tanks 36 and 38. As an added safety feature, note that if the pyrovalve 242 were fired accidentally, or by the occurrence of a fire, high pressure helium gas would still be isolated from the liquid hydrocarbon fuel storage tanks 36 and 38 by the solenoid pressure control valve 244. Pressure in the inlets of the liquid hydrocarbon fuel storage tanks 36 and 38 is monitored by a pressure transducer 246, which supplies a pressure signal which is monitored by the projectile computer control system 66. Using this pressure signal, the projectile computer control system 66 will operate the solenoid pressure control valve 244 to control the pressure of helium gas in the inlets of the liquid hydrocarbon fuel storage tanks 36 and 38.

Typically, pressure in the inlets of the liquid hydrocarbon fuel storage tanks 36 and 38 is maintained at approximately the same pressure as the pressure in the oxygen plenum 176 (typically 1000 psi). Whenever the pressure in the inlets of the liquid hydrocarbon fuel storage tanks 36 and 38 drops below the desired pressure, the projectile computer control system 66 will cause the solenoid pressure control valve 244 to be actuated for a short duration, typically a few milliseconds, to allow more helium gas to be injected into the inlets of the liquid hydrocarbon fuel storage tanks 36 and 38, thereby raising the pressure in the liquid hydrocarbon fuel storage tanks 36 and 38.

(Note that the propulsion systems of FIGS. 9 and 10, which will be discussed below, each have the same helium gas pressurization of the liquid hydrocarbon fuel storage tanks 36 and 38, as well as the same arrangements of the pressure transducer 238, the burst disk 240, the pyrovalve 242, the solenoid pressure control valve 244, and the pressure transducer 246 as contained in the propulsion system of FIG. 8, and are operated in the same manner by their relative projectile computer control systems 66.)

The rest of the propulsion system of FIG. 8 may now be briefly described. Rather than use only the oxygen plenum 176 as in FIG. 5, the propulsion system of FIG. 8 also uses an attitude control system plenum 248 to distribute oxygen gas supplied from the oxygen gas storage tanks 40 and 42. When the pyrovalve 172 has been opened by the projectile computer control system 66, oxygen gas will also be supplied to a solenoid pressure control valve 250.

The solenoid pressure control valve 250 will be opened by the projectile computer control system 66 to allow oxygen gas to flow into the attitude control system plenum 248. Pressure in the attitude control system plenum 248 is monitored by a pressure transducer 252, which supplies a pressure signal which is monitored by the projectile computer control system 66. Using this pressure signal, the projectile computer control system 66 will operate the solenoid pressure control valve 250 to control the pressure of oxygen gas in the attitude control system plenum 248.

Typically, pressure in the attitude control system plenum 248 is also maintained at approximately 1000 psi. Whenever the pressure in the attitude control system plenum 248 drops below the desired pressure, the projectile computer control system 66 will cause the solenoid pressure control valve 250 to be actuated for a short duration, typically a few milliseconds, to allow more oxygen gas to be injected into the attitude control system plenum 248, thereby raising the pressure in the attitude control system plenum 248.

Oxygen gas is supplied under pressure from the attitude control system plenum 248 to the control valves 156, 158, 160, 162, 164, and 166 of the attitude control thrusters 54, 56, 58, 60, 62, and 64, respectively. The attitude control thrusters 54, 56, 58, 60, 62, and 64 are jets in operation, since the release of the oxygen gas supplied from the attitude control system plenum 248 is their sole source of thrust. Unlike the propulsion system of FIG. 5, the propulsion system of FIG. 8 uses the attitude control system plenum 248 in addition to the oxygen plenum 176, and thus includes the additional components necessary to the operation of the attitude control system plenum 248.

This completes the description of the propulsion system of FIG. 8, which may be characterized as having its liquid hydrocarbon fuel storage tanks 36 and 38 pressurized by helium gas, and as having its attitude control 54, 56, 58, 60, 62, and 64 operated by (cold) oxygen gas from the attitude control system plenum 248.

Referring now specifically to FIG. 9, oxygen gas is supplied under pressure from the oxygen plenum 176 to the control valves 156, 158, 160, 162, 164, and 166 of the attitude control thrusters 54, 56, 58, 60, 62, and 64, respectively. The attitude control thrusters 54, 56, 58, 60, 62, and 64 are jets in operation, since the release of the oxygen gas supplied from the oxygen plenum 176 is their sole source of thrust.

This completes the description of the propulsion system of FIG. 9, which may be characterized as having its liquid hydrocarbon fuel storage tanks 36 and 38 pressurized by helium gas, and as having its attitude control 54, 56, 58, 60, 62, and 64 operated by (cold) oxygen gas from the oxygen plenum 176. Unlike the propulsion system of FIG. 8, the propulsion system of FIG. 9 does not use the attitude control system plenum 248 in addition to the oxygen plenum 176, and therefore is simplified in comparison to the propulsion system of FIG. 8.

Referring now specifically to FIG. 10, hot oxygen gas is supplied under pressure from the oxygen heater 44 to the control valves 156, 158, 160, 162, 164, and 166 of the attitude control thrusters 54, 56, 58, 60, 62, and 64, respectively. The attitude control thrusters 54, 56, 58, 60, 62, and 64 are again jets in operation, since the release of the hot oxygen gas supplied from the oxygen heater 44 is their sole source of thrust.

This completes the description of the propulsion system of FIG. 10, which may be characterized as having its liquid hydrocarbon fuel storage tanks 36 and 38 pressurized by helium gas, and as having its attitude control 54, 56, 58, 60, 62, and 64 operated by hot oxygen gas from the oxygen heater 44.

Although only six different embodiments of the propulsion system of the present invention have been illustrated herein, it will at once be appreciated by those skilled in the art that the various different design features of the present invention illustrated in those six embodiments may be combined in a wide variety of different permutations. Such different combinations will be readily apparent from the exemplary illustrations presented in the above description of the propulsion system of the present invention.

It may therefore be appreciated from the above detailed description of the preferred embodiment of the present invention that it teaches an improved propulsion system useable for divert and attitude control propulsion systems, and a related method for use thereof, which system and method exclusively use propellants which are non-toxic. As such, both the fuel and the oxidizer of the present invention are non-toxic, thereby eliminating one of the most serious drawbacks of previously known liquid or gel bipropellants or monopropellants. The propellants used by the propulsion system and the related method of the present invention are not subject to detonation in a fire, when hit by a stray bullet, or when subjected to high temperature.

The propulsion system and the related method of the present invention are efficiently operable in an on-off pulsatile manner unlike solid propellant systems. The improved propulsion system of the present invention also presents excellent center-of-gravity control, such that the characteristics of the missile in which the propulsion system of the present invention is installed will also feature excellent dynamic center-of-gravity characteristics. The weight of the improved propulsion system of the present invention is also relatively light in comparison to solid propulsion systems, and in fact is comparable to or less than the weight of previously known liquid bipropellant or monopropellant systems.

The propulsion system of the present invention is also of a construction which is both durable during operation, and long lasting in a storage situation, and which requires little or no maintenance to be provided throughout the time that it is stored. The propulsion system of the present invention is of comparable cost to previously known liquid bipropellant and monopropellant propulsion systems, and to solid propellant propulsion systems, thereby affording the propulsion system of the present invention the broadest possible market. Finally, all of the aforesaid advantages and objectives of the propellant system and the related method of use of the present invention are achieved without incurring any substantial relative disadvantage.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A method of igniting fuel fluid in a propulsion system, comprising:

a) storing a supply of fuel fluid in a fuel storage tank;

b) storing a supply of oxidant fluid in an oxidant storage tank;

c) heating the oxidant fluid above the ignition temperature of the fuel fluid in an oxidant heater; and d) supplying heated oxidant fluid from said oxidant heater and said fuel fluid from said fuel storage tank to a combustion chamber wherein said heated oxidant fluid and said fuel fluid impinge to thereby ignite the fuel fluid and produce thrust.

2. A method gas defined in claim 1, wherein said fuel fluid comprises white mineral oil.

3. An ignition assembly for a propulsion system, comprising:

a) a fuel storage tank for storing a supply of fuel fluid;

b) an oxidant storage tank for storing a supply of oxidant fluid;

c) an oxidant heater for pre-heating at least a portion of said oxidant fluid from said oxidant storage tank to a temperature above the ignition temperature of the fuel fluid;

d) a combustion chamber; and e) means for supplying pre-heated oxidant fluid from said oxidant heater and said fuel fluid from said fuel storage tank to said combustion chamber wherein said pre-heated oxidant fluid and said fuel fluid impinge to thereby ignite the fuel fluid and produce thrust.

4. An ignition assembly as defined in claim 3, wherein said fuel fluid comprises liquid hydrocarbon fuel.

5. An ignition assembly as defined in claim 4, wherein said fuel fluid comprises white mineral oil.

6. An ignition assembly as defined in claim 3, wherein said oxidant fluid comprises oxygen gas.

7. A propulsion system as defined in claim 3, wherein said oxidant heater comprises:

a metal pressure vessel reinforced with a high temperature overwrap;

means for admitting at least a portion of said oxidant fluid into said metal pressure vessel;

means for admitting at least a portion of said fuel fluid into said metal pressure vessel; and means for initiating combustion within said metal pressure vessel.

8. A propulsion system as defined in claim 7, wherein said metal pressure vessel is made from a material with excellent oxidation resistance at high temperatures.

9. A propulsion system as defined in claim 7, wherein said combustion initiating means comprises:

a solid propellant initiator.

10. A propulsion system as defined in claim 7, wherein said combustion initiating means comprises:

a spark plug.

11. A propulsion system as defined in claim 3, wherein said fuel fluid and said oxidant fluid each comprise:

a non-toxic propellant which is non-reactive during storage, transportation, and handling.

* * * * *